Patented Oct. 23, 1928.

1,688,469

UNITED STATES PATENT OFFICE.

KARL MIESCHER, OF BASEL, SWITZERLAND, ASSIGNOR TO SOCIETY OF CHEMICAL INDUSTRY IN BASLE, OF BASEL, SWITZERLAND.

DERIVATIVES OF QUINOLINE CARBOXYLIC ACIDS AND PROCESS OF MAKING SAME.

No Drawing. Application filed April 19, 1927, Serial No. 185,067, and in Switzerland April 30, 1926.

The present invention relates to new substituted derivatives of quinoline carboxylic acids useful in therapeutics, and it comprises the new compounds themselves and the process of making same.

The new compounds are obtained by causing an acid halide of a halogen quinoline carboxylic acid to react with a nitrogen compound of the general formula

wherein $R_1$ and $R_2$ mean H, or any monovalent radical. The halogen quinoline carboxylic acid amides thus obtained are then caused to react with compounds of the formula R.OH, R being any monovalent radical in presence of an agent binding hydrohalic acid. There are thus formed O- substituted quinoline carboxylic acid amides.

There are thus obtained, for example from α-chloro-γ-quinoline carboxylic acid chloride and diethylamine, the α-chloro-γ-quinoline carboxylic acid diethylamide and treatment of this with sodium alcoholate in alcoholic solution or with alcoholic potash produces the α-ethoxy-γ-quinoline carboxylic acid diethylamide.

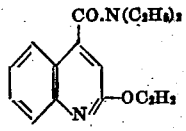

Instead of α-halogen-γ-quinoline carboxylic acid halides there may be used any other holagen quinoline carboxylic acid halide wherein the halogen is in the heterocyclic ring, for instance γ-halogen-α-quinoline carboxylic acid halide. The term "halogen quinoline carboxylic acid" includes any nucleal substitution derivatives of these.

The following examples illustrate the invention, the parts being by weight:—

EXAMPLE I.

*Chloro-quinoline carboxylic acid amides.*

1. α-chloro-γ-quinoline carboxylic acid dimethylamide of the formula

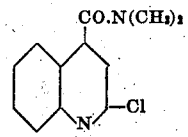

Finely subdivided α-chloro-γ-quinoline carboxylic acid chloride is introduced, while stirring vigorously, into an excess of concentrated aqueous dimethylamine solution. When reaction is complete the α-chloro-γ-quinoline carboxylic acid dimethyl amide is filtered and washed with water. When recrystallized from alcohol it forms colourless crystals of melting point 114° C.

2. α-chloro-γ-quinoline carboxylic acid diethylamide of the formula

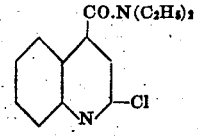

A benzene solution of 2.3 parts of α-chloro-γ-quinoline carboxylic acid chloride is mixed gradually, while cooling, with 1.5 part of diethylamine. When the reaction is complete, the separated diethylamine hydrochloride is filtered, washed with benzene and the solvent distilled. The residue is recrystallized from a little alcohol to obtain the α-chloro-γ-quinoline carboxylic acid diethylamide which forms colourless crystals of melting point 124° C.

In analogous manner the following compounds can be made:—

|  | Melting point. | Properties. |
|---|---|---|
| 1. α-chloro-γ-quinoline carboxylic acid-dipropyl amide | 77° C. | Colourless crystals. |
| 2. α-chloro-γ-quinoline carboxylic acid-diallylamide of the formula | 104° C. | Do. |

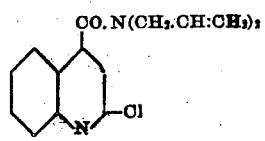

| | Melting point. | Properties. |
|---|---|---|
| 3. α-chloro-γ-quinoline carboxylic acid-di-isoamylamide of the formula<br>CO.N[CH₂.CH₂.CH(CH₃)₂]₂<br>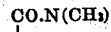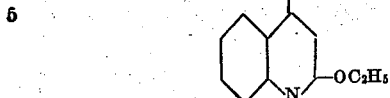 | | Yellowish oil, boiling point 185° under 0.015 mm. pressure. |
| 4. α-chloro-γ-quinoline carboxylic acid-piperidide | 140° C. | Colourless crystals. |
| 5. α-chloro-γ-quinoline carboxylic acid-N-ethylanilide of the formula<br>CO.N<C₂H₅/C₆H₅<br>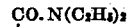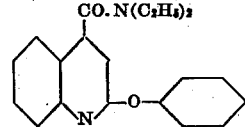 | 126° C. | Do. |
| 6. α-chloro-γ-quinoline carboxylic acid-monoethyl amide | 143° C. | Do. |
| 7. α-chloro-γ-quinoline carboxylic acid-benzylamide | 217° C. | Do. |

Example II.

Alkoxyquinoline carboxylic acid amides.

1. α-ethoxy-γ-quinoline carboxylic acid dimethylamide of the formula

CO.N(CH₃)₂

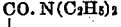
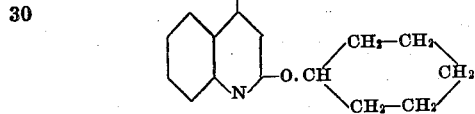

—OC₂H₅

A mixture of 10 parts of α-chloro-γ-quinoline carboxylic acid dimethylamide with a solution of 1 part of sodium in ethyl alcohol is boiled in a reflux apparatus. When the reaction is complete the alcohol is distilled and the residue extracted with ether and water. On evaporation the ethereal solution leaves a nearly colourless oil which gradually solidifies. This α-ethoxy-γ-quinoline carboxylic acid dimethylamide may be recrystallized from petroleum ether and forms colourless crystals of melting point 69° C. It is easily soluble in most organic solvents, except cold petroleum ether. It is also easily soluble in mineral acids.

Instead of sodium ethylate a solution of an alkali hydroxide in aqueous alcohol may be used for the reaction.

2. α-cyclohexyloxy-γ-quinoline carboxylic acid diethylamide of the formula

CO.N(C₂H₅)₂

A mixture of 12 parts of cyclohexanol, 70 parts of xylene and 2.5 parts of sodium is boiled until all the sodium has disappeared. After addition of 26 parts of α-chloro-γ-quinoline carboxylic acid diethylamide boiling is continued and after the reaction is complete the mixture is extracted with water and the solvent distilled. α-cyclohexyloxy-γ-quinoline carboxylic acid diethyl amide remains as a nearly colourless oil which gradually solidifies. When recrystallized from petroleum ether it melts at 63° C. It is easily soluble in organic solvents, except cold petroleum ether.

3. α-phenoxy-γ-quinoline carboxylic acid diethylamide of the formula

CO.N(C₂H₅)₂

A mixture of 5.2 parts of α-chloro-γ-quinoline carboxylic acid diethyl amide, 3 parts of sodium phenolate and 20 parts of phenol is boiled in a reflux apparatus. When the reaction is complete the mass is dissolved in ether and the phenol extracted by means of alkali lye. When the ethereal solution is evaporated the α-phenoxy-γ-quinoline carboxylic acid diethyl amide remains as a nearly colourless oil which rapidly solidifies to a white crystalline cake. When recrystallized from petroleum ether it melts at 112° C.

4. α-diethylamino-ethoxy-γ-quinoline carboxylic acid diethylamide of the formula

CO.N(C₂H₅)₂

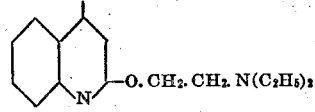

—O.CH₂.CH₂.N(C₂H₅)₂

12 parts of diethylamino ethanol are made to react with 2.3 parts of sodium in benzene solution. When the sodium is dissolved, 26 parts of α-chloro-γ-quinoline carboxylic acid diethylamide are added, whereupon reaction occurs with ebullition and turbidity. The whole is boiled for a long time and when it has been cooled the base is extracted by means of acid and separated. Sodium carbonate precipitates the base and it may be isolated by extraction with ether. There is thus obtained the α-diethylamino-ethoxy-γ-quinoline carboxylic acid diethyl amide in the form of a yellowish oil which dissolves easily in all organic solvents and in acids. It boils at 168–170° C. under 0.005 mm. pressure.

5. α-ethoxy-γ-quinoline carboxylic acid amide of the formula

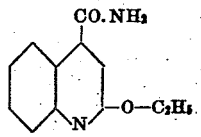

A mixture of 1 part of α-chloro-γ-quinoline carboxylic acid amide (see Mulert, Berl. Ber. 39, 1906, page 1903) with a solution of 0.2 part of sodium in alcohol is boiled until reaction is complete. The mixture is then diluted with water and filtered from the separated α-ethoxy-γ-quinoline carboxylic acid amide. From ethylacetate the compound may be recrystallized in the form of colourless crystals of melting point 205° C.

From the corresponding α-chloro-γ-quinoline carboxylic acid amides the following can be made:—

|  | Melting point. | Properties. |
|---|---|---|
| 1. According to Example II (1): |  |  |
| α-methoxy-γ-quinoline carboxylic acid-diethylamide | 93° C. | Colourless crystals. |
| α-ethoxy-γ-quinoline carboxylic acid-diethylamide | 68° C. | Do. |
| α-propyloxy-γ-quinoline carboxylic acid-diethylamide | 61° C. | Do. |
| α-isopropyloxy-γ-quinoline carboxylic acid-diethylamide |  | Colourless oil. |
| α-allyloxy-γ-quinoline carboxylic acid-diethylamide | 33° C. | Colourless crystals. |
| α-ethoxy-γ-quinoline carboxylic acid-dipropylamide | 60° C. | Do. |
| α-ethoxy-γ-quinoline carboxylic acid-diallylamide | 53° C. | Do. |
| α-ethoxy-γ-quinoline carboxylic acid-di-isoamylamide |  | Yellowish oil. |
| α-ethoxy-γ-quinoline carboxylic acid-piperidide | 90° C. | Colourless crystals. |
| α-ethoxy-γ-quinoline carboxylic acid-N-ethylanilide |  | Yellowish oil. |
| 2. According to Example II (2): |  |  |
| α-phenethoxy-γ-quinoline carboxylic acid diethylamide of the formula | 59° C. | Colourless crystals. |

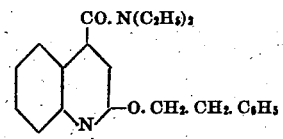

| 3. According to Example II (4): |  |  |
|---|---|---|
| α-diethylamino-ethoxy-γ-quinoline carboxylic acid anilide | 122° C. | Do. |
| 4. According to Example II (5): |  |  |
| α-ethoxy-γ-quinoline carboxylic acid monoethylamide | 152° C. | Do. |
| α-ethoxy-γ-quinoline carboxylic acid benzylamide | 166° C. | Do. |

What I claim is:—

1. A process for the manufacture of substituted derivatives of quinoline carboxylic acids by causing an acid halide of a halogen quinoline carboxylic acid wherein the halogen is in the heterocyclic ring to react with a nitrogen compound of the formula

wherein $R_1$ and $R_2$ mean H, or any monovalent radical.

2. A process for the manufacture of substituted derivatives of quinoline carboxylic acids by causing an acid halide of an α-halogen quinoline carboxylic acid to react with a nitrogen compound of the formula

wherein $R_1$ and $R_2$ mean H, or any monovalent radical.

3. A process for the manufacture of substituted derivatives of quinoline carboxylic acids by causing an acid halide of an α-halogen-γ-quinoline carboxylic acid to react with a nitrogen compound of the formula

wherein $R_1$ and $R_2$ mean H, or any monovalent radical.

4. A process for the manufacture of substituted derivatives of quinoline carboxylic acids by causing an acid halide of a halogen quinoline carboxylic acid wherein the halogen is in the heterocyclic ring to react with a nitrogen compound of the formula

wherein $R_1$ and $R_2$ mean H, or any monovalent radical, and causing the halogen quinoline carboxylic acid amides thus obtained to react with compounds of the formula R.OH, R being any monovalent radical, in presence of an agent binding hydrohalic acid.

5. A process for the manufacture of substituted derivatives of quinoline carboxylic acids by causing an acid halide of an α-halogen quinoline carboxylic acid to react with a nitrogen compound of the formula

wherein $R_1$ and $R_2$ mean H, or any monovalent radical, and causing the α-halogen quinoline carboxylic acid amides thus obtained to react with compounds of the formula R.OH, R being any monovalent radical, in presence of an agent binding hydrohalic acid.

6. A process for the manufacture of substituted derivatives of quinoline carboxylic acids by causing an acid halide of an α-halogen-γ-quinoline carboxylic acid to react with a nitrogen compound of the formula

wherein $R_1$ and $R_2$ mean H, or any monovalent radical and causing the α-halogen-γ-quinoline carboxylic acid amides thus obtained to react with compounds of the formula R.OH, R being any monovalent radical in presence of an agent binding hydrohalic acid.

7. A process for the manufacture of a substituted derivative of quinoline carboxylic acid by causing an acid halide of α-chloro-γ-quinoline carboxylic acid to react with dimethylamine and causing the α-chloro-γ-quinoline carboxylic acid dimethylamide thus obtained to react with ethyl alcohol in presence of an agent binding hydrohalic acid.

8. As new products derivatives of halogen quinoline carboxylic acid amides wherein the halogen is in the heterocyclic ring, and is substituted by a group OR, R being any monovalent radical, said products being useful in therapeutics.

9. As new products derivatives of α-halogen quinoline carboxylic acid amides wherein the halogen is substituted by a group OR, R being any monovalent radical, said products being useful in therapeutics.

10. As new products derivatives of α-halogen-γ-quinoline carboxylic acid amides wherein the halogen is substituted by a group OR, R being any monovalent radical, said products being useful in therapeutics.

11. As a new product the α-ethoxy-γ-quinoline carboxylic acid dimethylamide of the formula

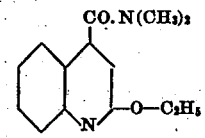

which forms colorless crystals of melting point 69° and is easily soluble in most organic solvents except in cold petroleum ether and likewise soluble in an excess of aqueous mineral acids, said product being useful in therapeutics.

In witness whereof I have hereunto signed my name this 7th day of April 1927.

KARL MIESCHER.